US012794276B2

(12) United States Patent
Chawla et al.

(10) Patent No.: US 12,794,276 B2
(45) Date of Patent: Nov. 10, 2026

(54) METHODOLOGY FOR PARALLEL RESONANT SERIES-SERIES (PRSS) TUNING FOR WIRELESS INDUCTIVE POWER TRANSFER SYSTEMS

(71) Applicants: Mayank Chawla, Logan, UT (US); Abhilash Kamineni, North Logan, UT (US); Dragan Maksimovic, Boulder, CO (US)

(72) Inventors: Mayank Chawla, Logan, UT (US); Abhilash Kamineni, North Logan, UT (US); Dragan Maksimovic, Boulder, CO (US)

(73) Assignees: Utah State University, Logan, UT (US); The Regents of the University of Colorado, Denver, CO (US)

( * ) Notice: Subject to any disclaimer, the term of this patent is extended or adjusted under 35 U.S.C. 154(b) by 26 days.

(21) Appl. No.: 19/170,996

(22) Filed: Apr. 4, 2025

(65) Prior Publication Data

US 2025/0373086 A1 Dec. 4, 2025

Related U.S. Application Data

(60) Provisional application No. 63/656,061, filed on Jun. 4, 2024.

(51) Int. Cl.
*H02J 50/70* (2016.01)
*G06F 30/367* (2020.01)
(Continued)

(52) U.S. Cl.
CPC ............ *H02J 50/70* (2016.02); *G06F 30/367* (2020.01); *H02J 50/005* (2020.01); *H02J 50/12* (2016.02); *G06F 2119/06* (2020.01)

(58) Field of Classification Search
CPC .......... H02J 50/70; H02J 50/005; H02J 50/12; G06F 30/367; G06F 2119/06; Y02B 70/10
(Continued)

(56) References Cited

U.S. PATENT DOCUMENTS 11,862,993 B1 * 1/2024 Inoue ...................... B60L 53/12
11,916,404 B1 2/2024 Pries et al.
(Continued)

FOREIGN PATENT DOCUMENTS

IN 202341032114 A 5/2023

OTHER PUBLICATIONS

Hui et al., "A Critical Review of Recent Progress in Mid-Range Wireless Power Transfer", IEEE Transactions on Power Electronics, vol. 29, No. 9, Sep. 2014, pp. 1-12.
(Continued)

*Primary Examiner* — Rexford N Barnie
*Assistant Examiner* — Thai H Tran
(74) *Attorney, Agent, or Firm* — Kunzler Needham & Hilton; Bruce R. Needham

(57) ABSTRACT

A power converter includes switching section, tuning section, and rectification section. The tuning section includes transformer with a primary inductance and a secondary inductance and a primary series capacitor connected in series with a primary winding and a secondary series capacitor connected in series with a secondary winding. The primary series capacitor is selected with a resonant frequency with the primary inductance and the secondary series capacitor is selected with the resonant frequency with the secondary inductance. The tuning section includes a resonant tank with a primary parallel capacitor connected in parallel with the primary series capacitor and the primary winding and a primary resonant inductor connected between
(Continued)

the switching section and a connection to the primary parallel capacitor. An input impedance of the resonant tank at a switching frequency is below a frequency intersecting an open circuit input impedance and a short circuit input impedance of the resonant tank.

20 Claims, 6 Drawing Sheets

(51) Int. Cl.

*H02J 50/00* (2016.01)
*H02J 50/12* (2016.01)
*G06F 119/06* (2020.01)

(58) Field of Classification Search

USPC .......................................................... 307/104

See application file for complete search history.

(56) References Cited

U.S. PATENT DOCUMENTS

2017/0240055 A1* 8/2017 Nguyen .................. B60L 53/12
2023/0170743 A1* 6/2023 Gu .......................... H02J 50/70
307/104

OTHER PUBLICATIONS

Li et al., "A Double-Sided LCC Compensation Network and Its Tuning Method for Wireless Power Transfer", IEEE Transactions on Vehicular Technology, vol. 64, No. 6, Jun. 2015, pp. 1-13.

Zhao et al., "A Misalignment-Tolerant Series-Hybrid Wireless EV Charging System With Integrated Magnetics", IEEE Transactions on Power Electronics, vol. 34, No. 2, Feb. 2019, pp. 1-10.

Feng et al., "Advances in High-Power Wireless Charging Systems: Overview and Design Considerations", IEEE Transactions on Transportation Electrification, vol. 66, No. 3, Sep. 2020, pp. 1-34.

Garcia et al., "Design, implementation issues and performance of an inductive power transfer system for electric vehicle chargers with series-series compensation", IET Power Electronics, The Institution of Engineering and Technology, Apr. 21, 2015, pp. 1-11.

* cited by examiner

METHODOLOGY FOR PARALLEL RESONANT SERIES-SERIES (PRSS) TUNING FOR WIRELESS INDUCTIVE POWER TRANSFER SYSTEMS

CROSS-REFERENCES TO RELATED APPLICATIONS

This application claims the benefit of U.S. Provisional Patent Application No. 63/656,061 entitled "METHODOLOGY FOR PARALLEL RESONANT SERIES-SERIES (PRSS) TUNING FOR WIRELESS INDUCTIVE POWER TRANSFER SYSTEMS" and filed on Jun. 4, 2024 for Mayank Chawla et al., which is incorporated herein by reference.

GOVERNMENT RIGHTS

This invention was made with government support under Contract No. 1941524 awarded by the National Science Foundation. The government has certain rights in the invention.

FIELD

This invention relates to switching power converters and more particularly relates to parallel resonant series-series tuning of a switching power converter.

BACKGROUND

Wireless inductive power transfer (IPT) systems have numerous industry applications today which include charging portable devices, electric vehicle charging, biomedical implants and various other applications. A double-sided inductor-capacitor-capacitor (LCC) compensation and its tuning method for IPT systems is widely used for IPT systems. Misalignment between the primary and secondary coils causes a decrease in coupling between the primary and secondary coils, which often leads to a drop in power transferred to the secondary.

SUMMARY

A power converter includes a switching section, a tuning section with an input connected to an output of the switching section, and a rectification section with an input connected to an output of the tuning section and an output connectable to a load. The tuning section includes a loosely coupled transformer with a primary inductance $L_p$ and a secondary inductance $L_s$ and a primary series capacitor $C_{ps}$ connected in series with a primary winding of the transformer and a secondary series capacitor $C_{ss}$ connected in series with a secondary winding of the transformer. The primary series capacitor $C_{ps}$ is chosen to be at a resonant frequency $\omega_r$ with the primary inductance $L_p$ and the secondary series capacitor $C_{ss}$ is chosen to be at the resonant frequency $\omega_r$ with the secondary inductance $L_s$. The tuning section includes a primary parallel capacitor $C_{pp}$, of a parallel resonant tank connected in parallel with the primary series capacitor $C_{ps}$ and the primary winding and a primary resonant inductor $L_{pr}$, of the parallel resonant tank connected in series between the output of the switching section and a connection between the primary parallel capacitor $C_{pp}$ and the primary series capacitor $C_{ps}$. An input impedance $Z_i$ of the parallel resonant tank at a switching frequency $\omega_s$ is below an intersection frequency $f_m$ intersecting an open circuit input impedance $Z_{i\infty}$ of the parallel resonant tank and a short circuit input impedance $Z_{i0}$ of the parallel resonant tank.

A method for designing a PRSS power converter includes selecting a primary inductance $L_p$, a secondary inductance $L_s$, a primary resistance $r_p$, a secondary resistance $r_s$, a primary quality factor $Q_1$, and a secondary quality factor $Q_2$ for a loosely coupled transformer comprising a primary charging pad and a secondary pad, a range of coupling coefficients k of the transformer, and a switching frequency $\omega_s$ of a switching section of the power converter and selecting a capacitance for a primary series capacitor $C_{ps}$ connected in series with a primary winding of the transformer and a secondary series capacitor $C_{ss}$ connected in series with a secondary winding of the transformer. The capacitance of the primary series capacitor $C_{ps}$ is chosen to be at a resonant frequency $\omega_r$ with the primary inductance $L_p$ and the capacitance of the secondary series capacitor $C_{ss}$ is chosen to be at the resonant frequency $\omega_r$ with the secondary inductance $L_s$. The resonant frequency, is equal to the switching frequency $\omega_s$. The method includes selecting a capacitance of a primary parallel capacitor $C_{pp}$, of a parallel resonant tank connected in parallel with the primary series capacitor $C_{ps}$ and the primary winding and an inductance of a primary resonant inductor $L_{pr}$, of the parallel resonant tank, connected in series between the output of the switching section and a connection between the primary parallel capacitor $C_{pp}$ and the primary series capacitor $C_{ps}$. An input impedance $Z_i$ of the parallel resonant tank at a switching frequency $\omega_s$ is below an intersection frequency $f_m$ intersecting an open circuit input impedance $Z_{i\infty}$ of the parallel resonant tank and a short circuit input impedance $Z_{i0}$ of the parallel resonant tank. The WPT power converter includes a rectification section with an input connected to an output of the tuning section and an output connectable to a load.

A wireless power transfer ("WPT") power converter includes a switching section with four semiconductor switches arranged in an H-bridge, a tuning section with an input connected to an output of the switching section, and a rectification section with an input connected to an output of the tuning section and an output connectable to a load. The rectification section is configured as an H-bridge rectifier with an output capacitor $C_f$ across output terminals of the output of the rectification section. The secondary winding and the rectification section are one of mobile and stationary. The tuning section includes a loosely coupled transformer with a primary inductance $L_p$ and a secondary inductance $L_s$, where the transformer includes an air gap between the primary winding configured as a primary charging pad and the secondary winding where the secondary winding and the rectification section are mobile. The tuning section includes a primary series capacitor $C_{ps}$ connected in series with a primary winding of the transformer and a secondary series capacitor $C_{ss}$ connected in series with a secondary winding of the transformer. The primary series capacitor $C_{ps}$ is chosen to be at a resonant frequency $\omega_r$ with the primary inductance $L_p$ and the secondary series capacitor $C_{ss}$ is chosen to be at the resonant frequency $\omega_r$ with the secondary inductance $L_s$. The resonant frequency $\omega_r$ is equal to the switching frequency $\omega_s$. The tuning section includes a primary parallel capacitor $C_{pp}$, of a parallel resonant tank connected in parallel with the primary series capacitor $C_{ps}$ and the primary winding, and a primary resonant inductor $L_{pr}$, of the parallel resonant tank connected in series between the output of the switching section and a connection between the primary parallel capacitor $C_{pp}$ and the primary series capacitor $C_{ps}$. An input impedance $Z_i$ of the parallel resonant tank at a switching frequency $\omega_s$ is below an intersection frequency $f_m$ intersecting an open circuit input impedance $Z_{i\infty}$ of the parallel resonant tank and a short circuit input impedance $Z_{i0}$ of the parallel resonant tank. The intersection frequency $f_m$ is defined as:

$$f_m = \frac{1}{2\pi\sqrt{2L_{pr}C_{pp}}}.$$

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
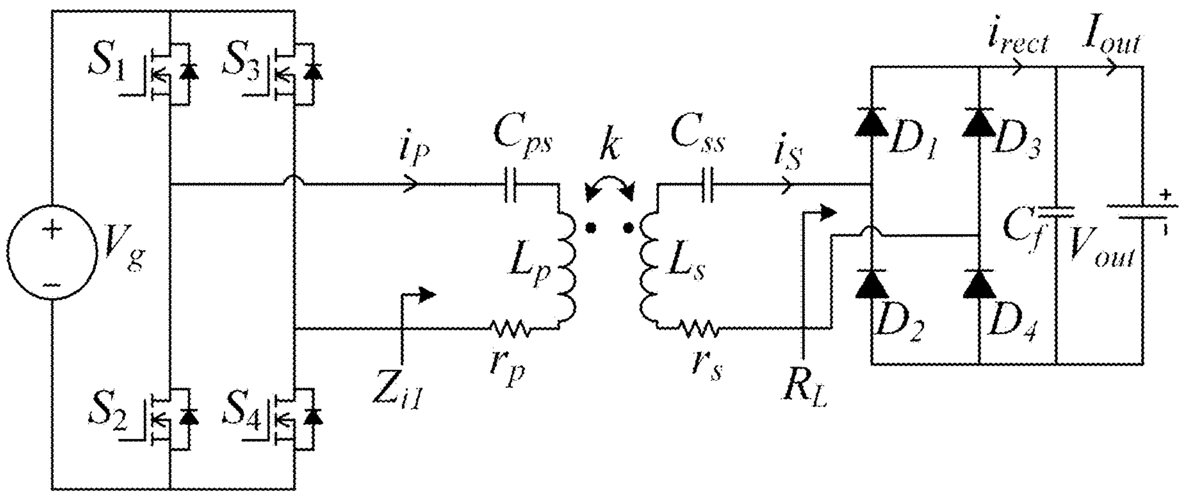
FIG. 1 is a schematic block diagram illustrating an inductive power transfer system with series-series compensation, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

A power converter includes a switching section, a tuning section with an input connected to an output of the switching section, and a rectification section with an input connected to an output of the tuning section and an output connectable to a load. The tuning section includes a loosely coupled transformer with a primary inductance $L_p$ and a secondary inductance $L_s$ and a primary series capacitor $C_{ps}$ connected in series with a primary winding of the transformer and a secondary series capacitor $C_{ss}$ connected in series with a secondary winding of the transformer. The primary series capacitor $C_{ps}$ is chosen to be at a resonant frequency $\omega_r$ with the primary inductance $L_p$ and the secondary series capacitor $C_{ss}$ is chosen to be at the resonant frequency $\omega_r$ with the secondary inductance $L_s$. The tuning section includes a primary parallel capacitor $C_{pp}$, of a parallel resonant tank connected in parallel with the primary series capacitor $C_{ps}$ and the primary winding and a primary resonant inductor $L_{pr}$, of the parallel resonant tank connected in series between the output of the switching section and a connection between the primary parallel capacitor $C_{pp}$ and the primary series capacitor $C_{ps}$. An input impedance $Z_i$ of the parallel resonant tank at a switching frequency $\omega_s$ is below an intersection frequency $f_m$ intersecting an open circuit input impedance $Z_{i\infty}$ of the parallel resonant tank and a short circuit input impedance $Z_{i0}$ of the parallel resonant tank.

In some embodiments, the switching section includes four switches arranged in an H-bridge and the rectification section is configured as an H-bridge rectifier with an output capacitor $C_f$ across output terminals of the output of the rectification section. In other embodiments, the switches of the switching section are semiconductor switches and the rectifier section includes diodes or semiconductor switches. In other embodiments, the transformer includes an air gap between the primary winding configured as a fixed primary charging pad and the secondary winding. The secondary winding and the rectification section are mobile or fixed.

In some embodiments, the intersection frequency $f_m$ is defined as:

$$f_m = \frac{1}{2\pi\sqrt{2L_{pr}C_{pp}}}.$$

In other embodiments, the primary winding and the secondary winding are coupled with a coupling coefficient k that is related to root-mean-square (RMS) current $I_{Prms}$ at the primary series capacitor $C_{ps}$ while output power $P_{out}$ at the load is substantially constant according to the equation:

$$P_{out} = \frac{\omega_r^2\left(k\sqrt{L_pL_s}\right)^2 I_{Prms}^2}{R_L + r_s},$$

wherein:

$r_s$ is a resistance of the secondary winding; and $R_L$ is a load impedance from an input to the rectification section.

Figure 10:
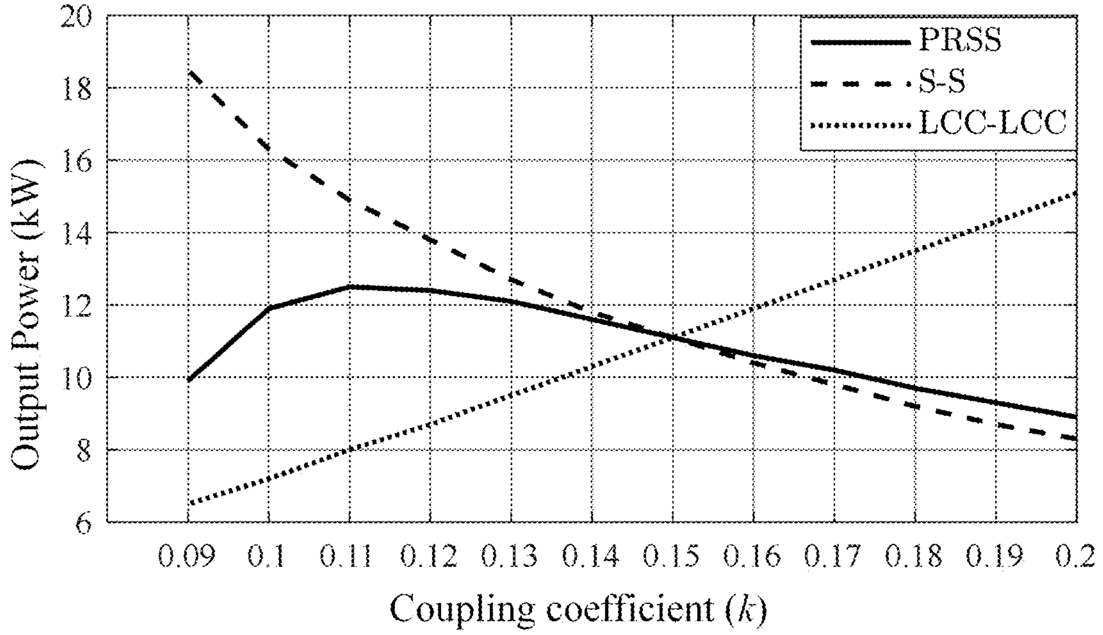
FIG. 10 is a plot of output power (kW) versus coupling coefficient (k) curves for PRSS, S-S, and LCC-LCC tuning, according to various embodiments.

As used herein, output power $P_{out}$ at the load being substantially constant includes that the output power may vary about 25%, as depicted in FIG. 10.

In some embodiments, the primary resonant inductor $L_{pr}$ and the primary parallel capacitor $C_{pp}$ are chosen such that the switching section operates as zero voltage switching for a conditions where the input impedance $Z_{i1}$ at the primary series capacitor $C_{ps}$ at the resonant frequency $\omega_r$ are defined by:

$$|Z_{i1}(\omega_r)| < R_{crit},$$

where $$R_{crit} = |Z_{o0}|\sqrt{\frac{-Z_{i\infty}}{Z_{io}}},$$

$$\omega_s = \omega_r,$$

$$X_s = \omega_s L_{pr},$$

$$X_p = -\frac{1}{\omega_s C_{pp}},$$

-continued $$Z_{i0} = jX_s,$$

$$Z_{i\infty} = jX_s + jX_p,$$

and $$Z_{o0}(j\omega_z) = \frac{jX_pX_s}{X_p + X_s}.$$

A method for designing a PRSS power converter includes selecting a primary inductance $L_p$, a secondary inductance $L_s$, a primary resistance $r_p$, a secondary resistance $r_s$, a primary quality factor $Q_1$, and a secondary quality factor $Q_2$ for a loosely coupled transformer comprising a primary charging pad and a secondary pad, a range of coupling coefficients k of the transformer, and a switching frequency $\omega_s$ of a switching section of the power converter. The method includes selecting a capacitance for a primary series capacitor $C_{ps}$ connected in series with a primary winding of the transformer and a secondary series capacitor $C_{ss}$ connected in series with a secondary winding of the transformer. The capacitance of the primary series capacitor $C_{ps}$ is chosen to be at a resonant frequency Or with the primary inductance $L_p$ and the capacitance of the secondary series capacitor $C_{ss}$ is chosen to be at the resonant frequency $\omega_r$ with the secondary inductance $L_s$. The resonant frequency $\omega_r$ is equal to the switching frequency $\omega_s$. The method includes selecting a capacitance of a primary parallel capacitor $C_{pp}$, of a parallel resonant tank connected in parallel with the primary series capacitor $C_{ps}$ and the primary winding and an inductance of a primary resonant inductor $L_{pr}$, of the parallel resonant tank, connected in series between the output of the switching section and a connection between the primary parallel capacitor $C_{pp}$ and the primary series capacitor $C_{ps}$. An input impedance $Z_i$ of the parallel resonant tank at a switching frequency $\omega_s$ is below an intersection frequency $f_m$ intersecting an open circuit input impedance $Z_{i\infty}$ of the parallel resonant tank and a short circuit input impedance $Z_{i0}$ of the parallel resonant tank. The WPT power converter includes a rectification section with an input connected to an output of the tuning section and an output connectable to a load.

In some embodiments, the switching section comprises four switches arranged in an H-bridge and the rectification section is configured as an H-bridge rectifier with an output capacitor $C_f$ across output terminals of the output of the rectification section. In other embodiments, the transformer includes an air gap between the primary winding configured as a fixed primary charging pad and the secondary winding configured. The secondary winding and the rectification section are mobile or stationary. In other embodiments, the intersection frequency $f_m$ is defined as:

$$f_m = \frac{1}{2\pi\sqrt{2L_{pr}C_{pp}}}.$$

In some embodiments, selecting the capacitance of the primary parallel capacitor $C_{pp}$ and the inductance of the primary resonant inductor $L_{pr}$ includes selecting the capacitance of the primary parallel capacitor $C_{pp}$ and the inductance of the primary resonant inductor $L_{pr}$ to meet zero voltage switching conditions where the input impedance $Z_{i1}$ at the primary series capacitor $C_{ps}$ at the resonant frequency $\omega_r$ are defined by:

$$|Z_{i1}(\omega_r)| < R_{crit},$$

where $$R_{crit} = |Z_{o0}|\sqrt{\frac{-Z_{i\infty}}{Z_{io}}},$$

$$\omega_s = \omega_r,$$

$$X_s = \omega_s L_{pr},$$

$$X_p = -\frac{1}{\omega_s C_{pp}},$$

$$Z_{i0} = jX_s,$$

$$Z_{i\infty} = jX_s + jX_p,$$

and $$Z_{o0}(j\omega_z) = \frac{jX_pX_s}{X_p + X_s}.$$

In some embodiments, the method includes selecting an output voltage $V_{out}$ and output power $P_{out}$ at the load and determining an equivalent load resistance $R_L$ at an input to the rectification section based on the selected output voltage $V_{out}$ and output power $P_{out}$ at the load, where:

$$R_L = \frac{8V_{out}^2}{\pi^2 P_{out}}.$$

In other embodiments, for a lowest coupling coefficient k in a selected range, the method includes calculating an absolute value of input impedance $|Z_{i1}|$ at the primary series capacitor $C_{ps}$ at the resonant frequency $\omega_r$, where the primary winding and the secondary winding are coupled with the coupling coefficient k and the input impedance $Z_{i1}$ at the primary series capacitor $C_{ps}$ is defined as:

$$Z_{i1}(\omega_r) = r_s + \frac{\omega_r^2\left(k\sqrt{L_pL_s}\right)^2}{R_L + r_s},$$

and calculating a root-mean-square ("RMS") value of current $I_{Prms}$ at the primary series capacitor $C_{ps}$ is $$I_{Prms} = \frac{I_p}{\sqrt{2}}$$

wherein $I_p$ comprises an input current to the primary series capacitor $C_{ps}$. is In some embodiments, the method includes selecting a maximum open circuit voltage $V_{oc}$ and a maximum short circuit current $I_{sc}$ at the primary series capacitor $C_{ps}$ based on:

$$\frac{|v|^2}{V_{oc}^2} + \frac{|i_p|^2}{I_{SC}^2} = 1.$$

A wireless power transfer ("WPT") power converter includes a switching section with four semiconductor switches arranged in an H-bridge, a tuning section with an input connected to an output of the switching section, and a rectification section with an input connected to an output of the tuning section and an output connectable to a load. The rectification section is configured as an H-bridge rectifier with an output capacitor $C_f$ across output terminals of the output of the rectification section. The tuning section includes a loosely coupled transformer with a primary inductance $L_p$ and a secondary inductance $L_s$, where the transformer includes an air gap between the primary winding configured as a primary charging pad and the secondary winding where the secondary winding and the rectification section are mobile or stationary. The tuning section includes a primary series capacitor $C_{ps}$ connected in series with a primary winding of the transformer and a secondary series capacitor $C_{ss}$ connected in series with a secondary winding of the transformer. The primary series capacitor $C_{ps}$ is chosen to be at a resonant frequency $\omega_r$ with the primary inductance $L_p$ and the secondary series capacitor $C_{ss}$ is chosen to be at the resonant frequency $\omega_r$ with the secondary inductance $L_s$. The resonant frequency $\omega_r$ is equal to the switching frequency $\omega_s$. The tuning section includes a primary parallel capacitor $C_{pp}$, of a parallel resonant tank connected in parallel with the primary series capacitor $C_{ps}$ and the primary winding, and a primary resonant inductor $L_{pr}$, of the parallel resonant tank connected in series between the output of the switching section and a connection between the primary parallel capacitor $C_{pp}$ and the primary series capacitor $C_{ps}$. An input impedance $Z_i$ of the parallel resonant tank at a switching frequency $\omega_s$ is below an intersection frequency $f_m$ intersecting an open circuit input impedance $Z_{i\infty}$ of the parallel resonant tank and a short circuit input impedance $Z_{i0}$ of the parallel resonant tank. The intersection frequency $f_m$ is defined as:

$$f_m = \frac{1}{2\pi\sqrt{2L_{pr}C_{pp}}};$$

and

In some embodiments, the primary winding and the secondary winding are coupled with a coupling coefficient k that is related to root-mean-square (RMS) current $I_{Prms}$ at the primary series capacitor $C_{ps}$ while output power $P_{out}$ at the load is substantially constant according to the equation:

$$P_{out} = \frac{\omega_r^2\left(k\sqrt{L_pL_s}\right)^2 I_{Prms}^2}{R_L + r_s},$$

wherein:

$r_s$ is a resistance of the secondary winding; and $R_L$ is a load impedance from an input to the rectification section.

In some embodiments, the primary resonant inductor $L_{pr}$ and the primary parallel capacitor $C_{pp}$ are chosen such that the switching section operates as zero voltage switching for a conditions where the input impedance $Z_{i1}$ at the primary series capacitor $C_{ps}$ at the resonant frequency or are defined by:

$$|Z_{i1}(\omega_r)| < R_{crit},$$

where $$R_{crit} = |Z_{o0}|\sqrt{\frac{-Z_{i\infty}}{Z_{io}}},$$

-continued $$\omega_s = \omega_r,$$

$$X_s = \omega_s L_{pr},$$

$$X_p = -\frac{1}{\omega_s C_{pp}},$$

$$Z_{i0} = jX_s,$$

$$Z_{i\infty} = jX_s + jX_p,$$

and $$Z_{o0}(j\omega_z) = \frac{jX_pX_s}{X_p + X_s}.$$

In some embodiments, for a selected output voltage $V_{out}$ and for a selected output power $P_{out}$ at the load, an equivalent load resistance $R_L$ at an input to the rectification section is based on the selected output voltage $V_{out}$ and output power $P_{out}$ at the load, where:

$$R_L = \frac{8V_{out}^2}{\pi^2 P_{out}}.$$

In other embodiments, a root-mean-square (RMS) value of current $I_{Prms}$ at the primary series capacitor $C_{ps}$ is calculated as $$I_{Prms} = \frac{I_p}{\sqrt{2}}$$

where $I_p$ includes an input current to the primary series capacitor $C_{ps}$, where the primary winding and the secondary winding are coupled with a coupling coefficient k and the input impedance $Z_{i1}$ at the primary series capacitor $C_{ps}$ at the resonant frequency $\omega_r$ is defined as:

$$Z_{i1}(\omega_r) = r_s + \frac{\omega_r^2\left(k\sqrt{L_pL_s}\right)^2}{R_L + r_s},$$

where:

$r_s$ is a resistance of the secondary winding; and $R_L$ is a load impedance from an input to the rectification section, and a maximum open circuit voltage $V_{oc}$ and a maximum short circuit current $I_{sc}$ at the input at the primary series capacitor $C_{ps}$ are determined based on:

$$\frac{|v|^2}{v_{oc}^2} + \frac{|i_p|^2}{I_{SC}^2} = 1.$$

I. INTRODUCTION

Wireless inductive power transfer (IPT) systems have numerous industry applications today which include charging portable devices, electric vehicle charging, biomedical implants and various other applications. There are several companies working on IPT systems such as Apple®, WiTricity®, Wave IPT™, Qualcomm® and many other companies which work on different IPT applications. A double-sided inductor-capacitor-capacitor (LCC) compensation and its tuning method for IPT systems is widely used for IPT systems.

Misalignment between the primary and secondary coils causes a decrease in coupling between the primary and secondary coils, which often leads to a drop in power transferred to the secondary. However, it is desirable to have a relatively constant output power regardless of the misalignment. Therefore, to compensate for the misalignment system designers often use complex coil structures and extra converters for IPT systems. Coil design techniques have been explored to reduce the effects of misalignment on the coupling coefficient which increases the complexity of the coil design for IPT systems. A series hybrid topology to improve the misalignment tolerance of IPT systems is proposed, however this topology uses polarized magnetic coupler. Zero voltage switching (ZVS) analysis is an important factor for high power IPT systems.

A parallel resonant series-series (PRSS) tuning method is proposed for IPT systems to deliver nearly constant power from primary to secondary for a range of coupling coefficient k without any external controls required. The design of tuning method is based on the coupling coefficient k between the primary and secondary coils and can be used for any type of coil. Moreover, for the PRSS design, the range of coupling coefficient over which nearly constant power is desired can be selected by the designer, which helps in designing the PRSS tuning method for both static and dynamic IPT systems.

II. PARALLEL RESONANT SERIES-SERIES (PRSS) TUNING

A. Background Of Series-Series Compensation

Figure 2:
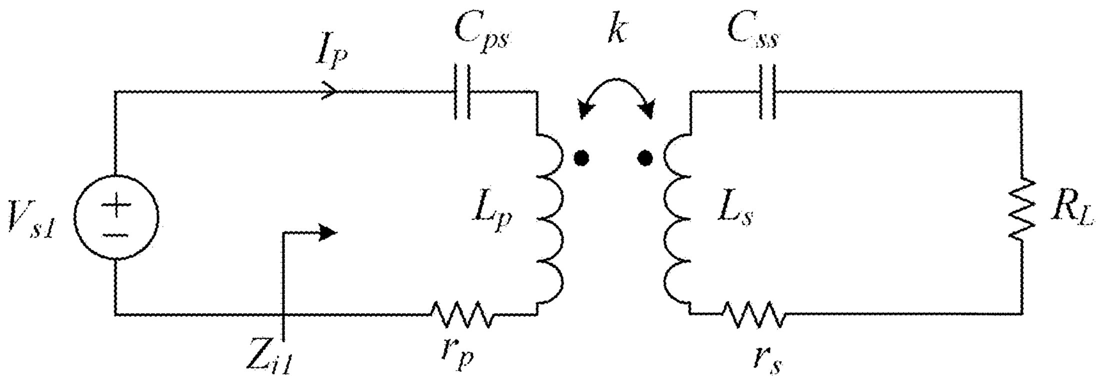
FIG. 2 is a schematic block diagram illustrating an equivalent circuit of the inductive power transfer system with series-series compensation of FIG. 1, according to various embodiments.

The PRSS tuning method described herein for IPT systems is a further extension of a series-series compensation. In FIG. 1, Vg is the input direct current (DC) voltage, $L_p$ and $L_s$ are the self-inductances of primary and secondary coils respectively, $r_p$ and $r_s$ are the equivalent series resistances of the primary and secondary coils respectively, k is the coupling coefficient between primary and secondary coil, M is defined as the mutual inductance between the two coils and given in equation (1), and $C_{ps}$ and $C_{ss}$ are the compensation capacitors for $L_p$ and $L_s$ respectively. $V_{out}$ and Iout are the output voltage and current. FIG. 2 represents an equivalent circuit of series-series compensation where the inverter and rectifier of FIG. 1 are modeled using sinusoidal approximation. $V_{s1}$ is the peak value of fundamental component of output voltage of an H-bridge inverter by sinusoidal approximation as shown in FIG. 2 and given in equation (2). $R_L$ in FIG. 2 is the equivalent load resistance seen from the rectifier circuit as shown in FIG. 1 and is given in equation (3). Zur is the input impedance seen from the point shown in FIG. 2. If $L_s$ and $L_p$ are compensated by $C_{ss}$ and $C_{ps}$ respectively using series-series compensation operating at the switching frequency $\omega_s$ equal to the resonant frequency $\omega_r$, $Z_{i1}$ is purely resistive which can be analyzed using a T-model of coupled inductors for a series-series compensation and $Z_i$ at $\omega_r$ denoted as $Z_i$ ($\omega_r$) is given in equation (4).

$$M = k\sqrt{L_pL_s} \tag{1}$$

$$V_{s1} = \frac{4}{\pi}V_g \tag{2}$$

$$R_L = \frac{8V_{out}^2}{\pi^2 P_{out}} \tag{3}$$

-continued $$Z_{i1}(\omega_r) = r_p + \frac{\omega_r^2 M^2}{R_L + r_s} \quad (4)$$

The power transferred to the secondary circuit for series-series compensation in FIG. 2 is given in equation (5), where $I_{Prms}$ is the root-mean-square (RMS) value of $i_p$ in FIG. 1. $P_{out}$ is defined as output power given in equation (6) and is nearly equal to power transferred to the secondary $P_s$ given in equation (5).

$$P_s = \frac{\omega_r^2 M^2}{R_L + r_s} I_{Prms}^2 \quad (5)$$

$$P_{out} = V_{out} I_{out} \quad (6)$$

From the series-series compensation, it can be observed from the power transfer equation (5), that if the resonant frequency $\omega_r$, the equivalent load resistance $R_L$ and the equivalent series resistance $r_s$ are kept constant, the power transfer to secondary can be changed by either changing $I_{Prms}$ or M. With misalignments in the IPT system, the value of coupling coefficient k will decrease, due to which M will decrease from equation (1), and from equation (5) it is possible to maintain a nearly constant power for a range of k by increasing $I_{Prms}$ slightly as k decreases.

B. Introduction To PRSS Tuning

Figure 3:
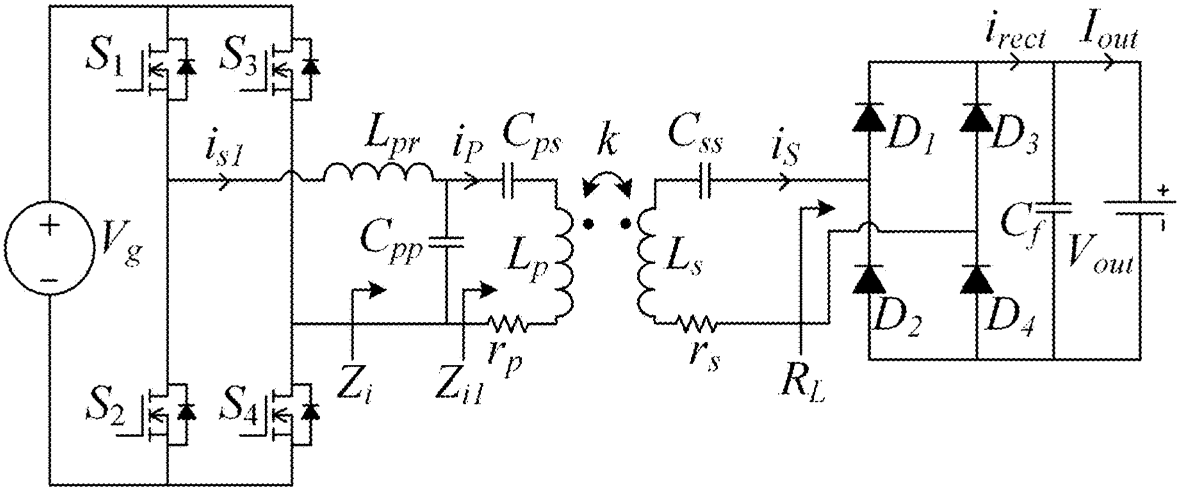
FIG. 3 is a parallel resonant series-series (PRSS) tuning system, according to various embodiments.
Figure 4A:
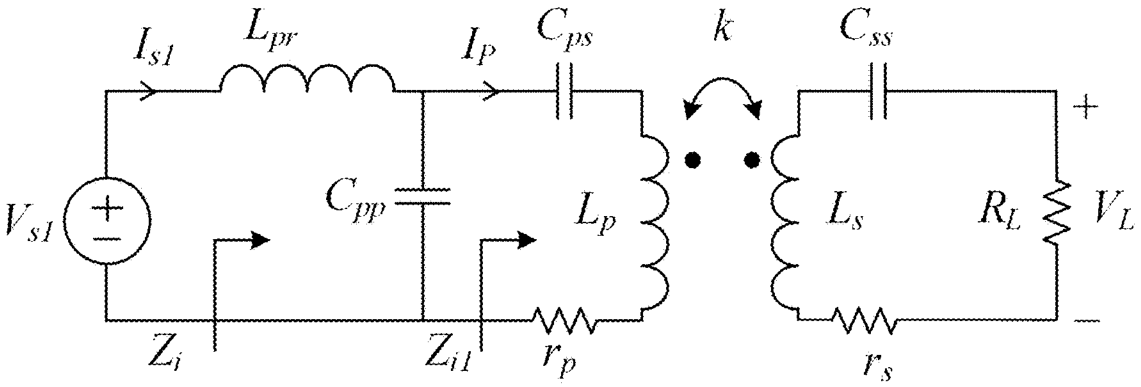
FIG. 4A is a schematic block diagram of an equivalent circuit of the PRSS tuning of FIG. 3, according to various embodiments.

FIG. 3 represents the PRSS tuning, where a parallel resonant tank is added before a series-series compensation. $L_{pr}$ and $C_{pp}$ in FIG. 3 are the inductance and capacitance of a parallel resonant tank respectively. FIG. 4A represents an equivalent circuit for PRSS tuning in FIG. 3. $V_{s1}$ is the peak value of fundamental component of output voltage of H-bridge inverter by sinusoidal approximation and given in equation (2), $Z_i$ and $Z_{i1}$ are the input impedance from the point shown in FIG. 4A. If the system is operated at the switching frequency ($\omega_s$) equal to the resonant frequency ($\omega_r$) of $L_p$ and $C_{ps}$, and $L_s$ and $C_{ss}$, then $Z_{i1}$ is purely resistive and is equal to $Z_{i1}$ ($\omega_r$) as mentioned in Section II A.

Figure 4B:
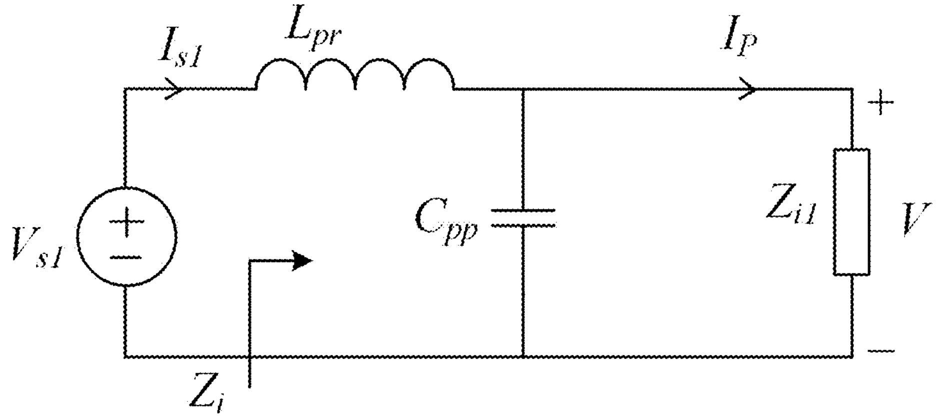
FIG. 4B is a schematic block diagram of an equivalent circuit with impedance $Z_i$ of the PRSS tuning of FIG. 3, according to various embodiments.

The equivalent model of FIG. 4A can be represented in FIG. 4B, where a parallel resonant tank has a resistive load of $Z_{i1}$ at resonant frequency $\omega_r$. The expression for peak value for input current to the series-series section $i_p$ and peak value of current to the parallel resonant tank $I_{s1}$ in FIG. 4A are given in equations (7) and (8), where s is equal to jω.

$$I_P = \left| \frac{\frac{1}{sC_{pp}}}{Z_{i1} + \frac{1}{sC_{pp}}} \right| I_{s1} \quad (7)$$

$$I_{s1} = \frac{V_{S1}}{|Z_i|} \quad (8)$$

$$I_{Prms} = \frac{I_p}{\sqrt{2}}. \quad (9)$$

Figure 5:
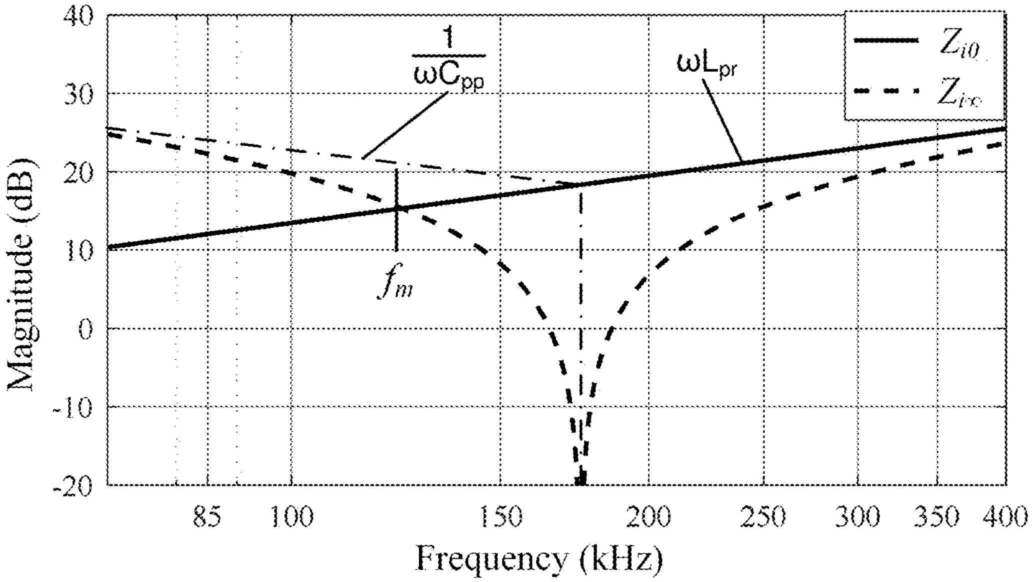
FIG. 5 is a plot of impedance $|Z_i|$ for a parallel LC tank for limiting cases $|Z_i|\rightarrow 0$ and $|Z_{i1}|\rightarrow\infty$, according to various embodiments.

It should be noted that $I_{Prms}$ given in equation (9) is the current that is responsible for transferring power in proposed tuning as mentioned in series-series compensation given in equation (5). It can also be observed from equation (4), as the value of k decreases, the value of $|Z_{i1}(\omega_r)|$ also decreases. In FIG. 4B, $|Z_i|$ is the resistive load to the parallel resonant tank at $\omega_r$. FIG. 5 represents the behavior of input impedance $|Z_i|$ with resistive load $|Z_{i1}$ where $|Z_{i0}|$ is the resistance when $|Z_{i1}|$ is shorted given in equation (10) and $|Z_i|$ is the resistance when $|Z_{i1}|$ is open circuited given in equation (11). If the switching frequency of operation ($f_s$) is less than $f_m$, which is the intersection frequency of $|Z_{i0}|$ and $|Z_{i1}|$, $|Z_{i1}$ decreases with decrease in resistive load $|Z_{i1}|$. With decrease in $|Z_{i1}|$, $|Z|$ should decrease below $f_m$, due to which $I_{sl}$ and $i_p$ should increase. Thus, a nearly constant power can be maintained for a range of k by increasing $i_p$ and thus $I_{Prms}$ slightly as k decreases.

$$Z_{i0} = sL_{pr} \quad (10)$$

$$Z_{i\infty} = sL_{pr} + \frac{1}{sC_{pp}}. \quad (11)$$

Figure 4C:
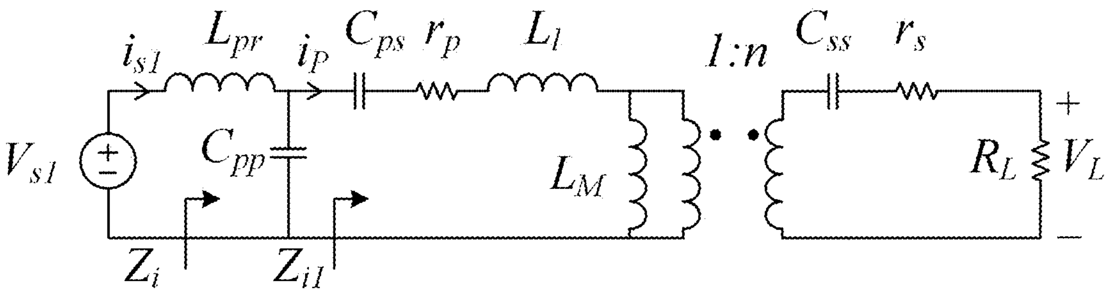
FIG. 4C is a schematic block diagram of a transformer model for an equivalent circuit of the PRSS tuning of FIG. 3, according to various embodiments.
Figure 4D:
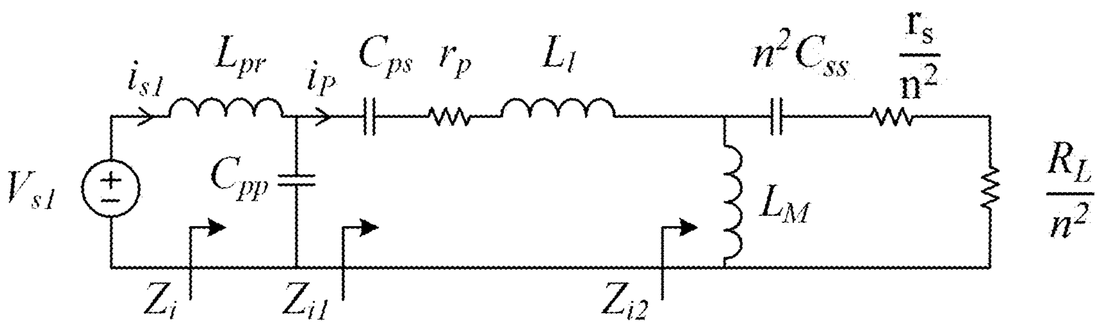
FIG. 4D is a schematic block diagram of the transformer model of FIG. 4C referred to the primary circuit, according to various embodiments.

For analyzing $Z_i$, transformer model of coupled inductors given in FIG. 4C is used, where $L_l$, $L_M$ and turns ratio n are given in equations (12), (13) and (14) respectively. $Z_i$ and $Z_{i1}$ in FIG. 4C are analyzed in terms of impedances defined by means of phasors rotating at frequency ω where s=jω is used for analysis. All the impedances in FIG. 4C are referred to primary side as shown in FIG. 4D, where impedance $Z_{i2}$ shown in FIG. 4D is given in equation (15). FIG. 4D is then used to derive $Z_i$ given in equation (16) and $Z_i$ given in equation (17) in terms of $Z_{i2}$.

$$L_l = (1 - k^2)L_p \quad (12)$$

$$L_M = k^2 L_p \quad (13)$$

$$n = \frac{1}{k}\sqrt{\frac{L_s}{L_p}} \quad (14)$$

$$Z_{i2} = \frac{\left(\frac{rs}{n^2} + \frac{r_L}{n^2} + \frac{1}{sn^2 C_{ss}}\right)(sL_M)}{\left(\frac{rs}{n^2} + \frac{r_L}{n^2} + \frac{1}{sn^2 C_{ss}}\right) + (sL_M)} \quad (15)$$

$$Z_{i1} = \frac{1}{sC_{ps}} + r_p + sL_l + Z_{i2} \quad (16)$$

$$Z_i = sL_{pr} + \frac{(Z_{i1})\left(\frac{1}{sC_{ss}}\right)}{(Z_{i1}) + \left(\frac{1}{sC_{ss}}\right)}. \quad (17)$$

III. DESIGN PROCEDURE FOR PRSS TUNING

A. Detailed Design Procedure

A. Detailed Design Procedure

This section describes the complete design procedure and steps to be followed for designing the PRSS tuning for IPT systems. The parameters in FIG. 3 are same as parameters mentioned in Section II A.

(i) The primary coil and secondary coil are designed considering the following self inductances and losses in the coil represented by $L_p$, $r_p$, $L_s$ and $r_s$, and then also determining the quality factors $Q_1$ and $Q_2$ of primary and secondary coil respectively from equation (18):

$$Q_1 = \frac{\omega_s L_p}{R_p} \text{ and } Q_2 = \frac{\omega_s L_s}{R_s}. \quad (18)$$

(ii) $C_{ss}$ and $C_{ps}$ are selected using series-series compensation, where switching frequency $\omega_s$ is kept equal to the resonant frequency $\omega_r$ of $L_s$ and $C_{ss}$, and $L_p$ and $C_{ps}$.

(iii) Then, determining the value of load resistance $R_L$ at which the maximum efficiency occurs for a series-series tuned system using equation (19). $V_{out}$ in FIG. 3 is also evaluated from equation (20), where $P_{out}$ is output power which is a known value and is nearly equal to $P_s$, the power transferred to the secondary circuit. It should be noted here that $R_L$ at maximum efficiency point is chosen for a better system performance. In a practical system, $R_L$ would depend on the battery voltage of the system.

$$R_L = kr_s\sqrt{Q_2Q_1} \tag{19}$$

$$V_{out} = \sqrt{\frac{R_L\pi^2 P_{out}}{8}}. \tag{20}$$

(iv) The magnitude of $Z_{i1}$, $|Z_{i1}$ mentioned in FIG. 4B is calculated at switching frequency of operation $\omega_s$ ($\omega_s=\omega_r=2\pi f_s$) at lowest coupling coefficient k value for the range of constant power to be achieved from equation (4) and is equal to $|Z_{i1}$ (W). $|Z_{i1}|$ calculated can be denoted as $|Z_{i1}|_{nom}$. Using this value of $|Z_{i1}|$nom, calculate $I_{Prms}$ in FIG. 4B at $\omega_s$ from the power transfer equation given in equation (5) for a value of k that is somewhere in lower to middle range of k for constant power transfer.

(v) After the values $|Z_{i1}|_{nom}$ and $I_{Prms}$ from step (iv) are evaluated, determine the peak value $I_p$ ($I_p=\sqrt{2}\ I_{Prms}$) and peak value V ($V=I_p|Z_i|_{nom}$) denoted in FIG. 4B across $|Z_{i1}|$ at this operating point.

(vi) Follow a detailed design procedure for parallel resonant tank such that $f_s$ is less than $f_m$ as shown in FIG. 5 and also verify the zero voltage switching (ZVS) condition.

B. Parallel Resonant Tank Design for PRSS Tuning

Figure 6:
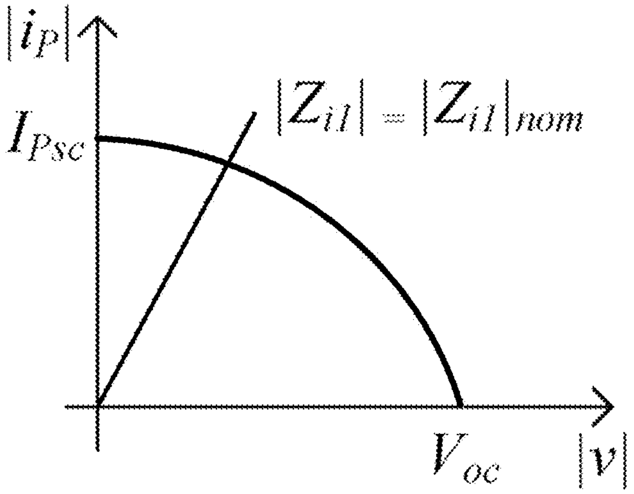
FIG. 6 is a diagram depicting a v-i characteristic for $|Z_{i1}|=|Z_{i1}|_{nom}$, where $|\ |Z_{i1}|_{nom}$ is a nominal value of $|Z_{i1}|$, according to various embodiments.
Figure 7:
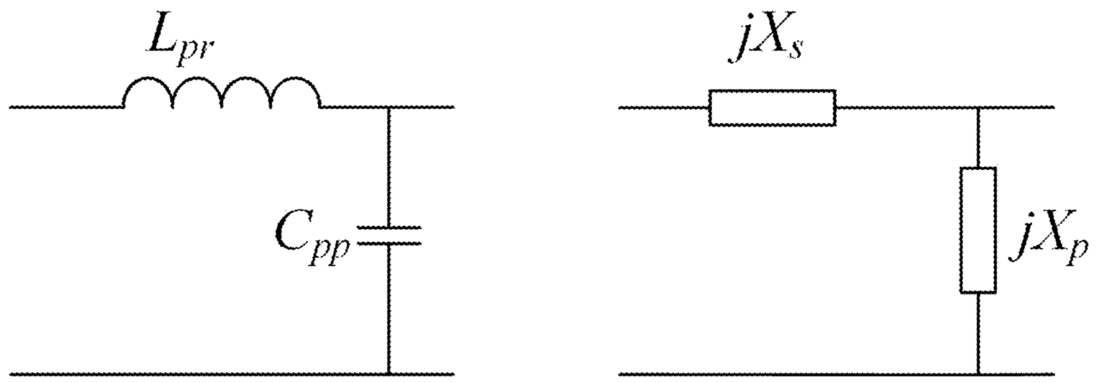
FIG. 7 is a plot of short circuit input impedance $Z_{i0}$ and open circuit input impedance $Z_{i\infty}$ for an LC tank design for PRSS tuning; according to various embodiments.

For the parallel resonant tank design of FIG. 4B and FIG. 7, solve the output v-i characteristics of the resonant inverter using the values obtained in Section III A step (vi) using equation (21). FIG. 6 is a diagram depicting a v-i characteristic for $|Z_{i1}|=|Z_{i1}|$nom, where $|Z_{i1}|_{nom}$ is a nominal value of $|Z_{i1}|$. From FIG. 6, voltage reaches a maximum at the open circuit voltage $V_{oc}$ and the current reaches a maximum at the short circuit current $I_{Psc}$. $V_{oc}$ is the peak open circuit voltage across $Z_{i1}$ in FIG. 4B when $Z_{i1}\rightarrow 1$ or $Z_{i1}$ is open circuited. $I_{Psc}$ is the peak short circuit current in $Z_{i1}$ in FIG. 4B when $Z_{i1}\rightarrow 0$ or $Z_{i1}$ is shorted.

$$\frac{V^2}{V_{oc}^2} + \frac{I_P^2}{I_{Psc}^2} = 1 \tag{21}$$

Then finding $|Z_{o0}|$ (magnitude of output impedance with input $V_{s1}$ shorted) and $|H\infty|$ (open circuit gain in terms of tank elements) in FIG. 4B at frequency of operation $\omega_s$ ($\omega_s=\omega_r$) from equations (22) and (23).

$$|Z_{o0}| = \frac{V_{oc}}{I_{Psc}} \tag{22}$$

$$|H_\infty| = \frac{V_{oc}}{V_{s1}} \tag{23}$$

Resonant tank elements in FIG. 7 are then selected to meet the specifications at frequency of operation $\omega_s$ ($\omega_s=\omega_r$):

$$X_s = \omega_s L_{pr} \tag{24}$$

$$X_p = -\frac{1}{\omega_s C_{ss}}. \tag{25}$$

$Z_{o0}$ ($j\omega_s$) and $H_\infty(j\omega_s)$ can also be found from FIG. 7 as given in equations (26) and (27) respectively. Solving for $X_s$ and $X_p$ from equations (29) and (28) respectively, and then finally $L_{pr}$ and $C_{pp}$ using equations (24) and (25) respectively.

$$Z_{o0}(j\omega_s) = \frac{jX_pX_s}{X_p + X_s} \tag{26}$$

$$H_\infty(j\omega_s) = \frac{jX_p}{jX_p + jX_s} \tag{27}$$

$$jX_p = \frac{Z_{o0}(j\omega_s)}{1 - H_\infty(j\omega_s)} \tag{28}$$

$$X_s = X_p\frac{1 - H_\infty(j\omega_s)}{H_\infty(j\omega_s)}. \tag{29}$$

After solving for $L_{pr}$ and $C_{pp}$, it is to be verified that the switching frequency of operation ($f_s$) is less than $f_m$ where $f_m$ is given in equations (30). The ZVS conditions for the inverter transistors can be verified from equations (31) and (32), where $Z_{i0}$ and $Z_{i1}$ are given in equations (33) and (34) respectively:

$$f_m = \frac{1}{2\pi\sqrt{2L_{pr}C_{pp}}} \tag{30}$$

$$|Z_{i1}(\omega_r)| < R_{crit} \tag{31}$$

$$R_{crit} = |Z_{o0}|\sqrt{\frac{-Z_{i\infty}}{Z_{io}}} \tag{32}$$

$$Z_{io} = j\omega_s \tag{33}$$

$$Z_{i\infty} = j(X_s + X_p). \tag{34}$$

IV. Design Example of PRSS Tuning

This section provides a design example of a 10 kilowatt (kW) dynamic wireless power transfer (DWPT) system for PRSS tuning, which uses standard values of range of coupling coefficient k seen in DWPT systems, for which a nearly constant power system is designed. The design example has then been verified with simulations.

A. Design Analysis

The parameters for the design example are provided in Table I. Then, the detailed design procedure mentioned in Section III is followed.

TABLE I

| Parameters for DWPT system design of PRSS tuning. | |
|---|---|
| Parameter | Value |
| fs | 85 kilohertz (kHz) |
| $V_g$ | 300 volts (V) |
| $L_p$ | 50 microhenries (µH) |
| $L_s$ | 63 µH |
| k | 0.09-0.2 |

(i) Selecting the values of $Q_1$ and $Q_2$ to be 333 and 336 respectively. The values of $r_p$ and $r_s$ calculated from equation (18) are 0.08 ohms (Ω) and 0.1Ω respectively.

(ii) Then compensating $L_p$ and $L_s$ from Table I with $C_{ps}$ and $C_{ss}$ respectively using series-series compensation at resonant frequency $\omega_r$ equal to switching frequency of operation $\omega_s$ ($\omega_s=2\times f_s$). The calculated values of $C_{ps}$ and $C_{ss}$ are 70 nano farads (nF) and 56 nF respectively.

(iii) Calculating the value of $R_L$ from equation (19) to be 3Ω and value of $V_{out}$ to be 190 V from equation (20). The value of $V_{out}$ is slightly adjusted to 180 V for better performance.

(iv) $|Z_i|$ equal to $|Z_{i1}(\omega_r)|$ mentioned in FIG. 4B is calculated from equation (4) at $f_s$. The value of $|Z_{i1}|_{nom}$ at $f_s$ and k=0.09 is calculated to be 2Ω. $I_{Prms}$ at k=0.12 at $f_s$ to transfer output power of 10 kW is calculated to be 50 amperes (A).

(v) V and $I_p$ in FIG. 4B are calculated to be 142 V and 70.7 A respectively.

(vi) Then selecting $V_{oc}$ to be 550 V and calculating $L_{pr}$ and $C_{pp}$ using the detailed design procedure in Section III B to be 7.5 micro henrys (µH) and 110 nF respectively.

Figure 8:
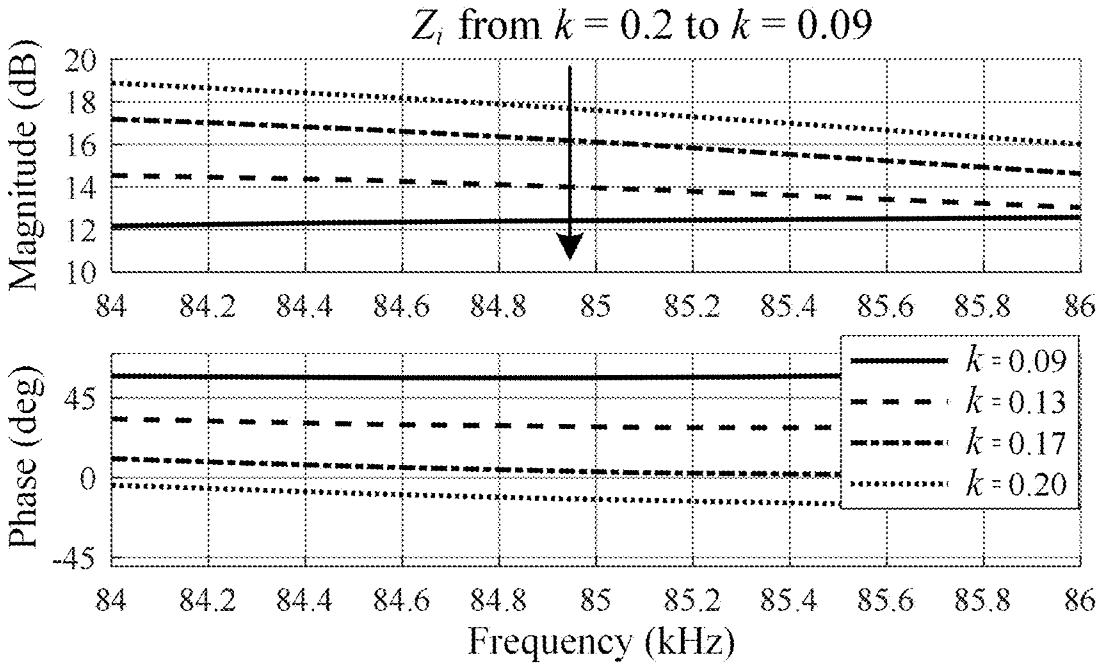
FIG. 8 is a plot of input impedance $Z_i$ versus frequency for PRSS tuning, according to various embodiments.
Figure 9:
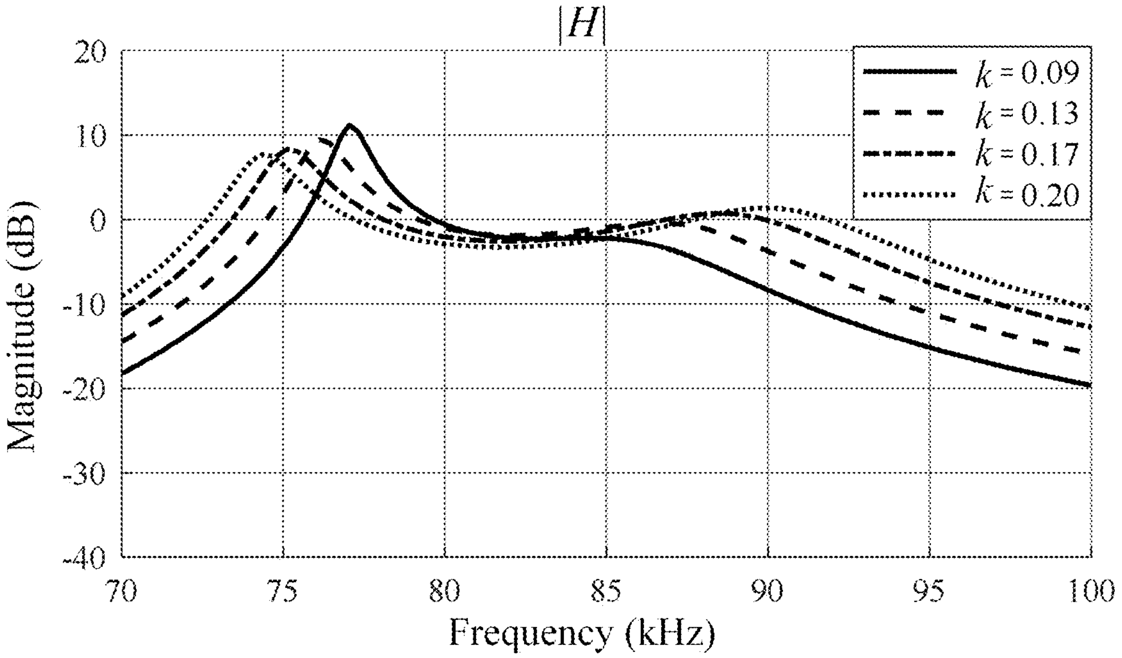
FIG. 9 is a plot of open circuit gain $|H|$ versus frequency for PRSS tuning, according to various embodiments.

The intersection frequency of $|Z_{i0}|$ and $|Z_{i1}|$ $f_m$ can be obtained from equation (30) and is equal to 123 kilohertz (kHz). $R_{erit}$ at $f_s$ can be evaluated from equation (32) for ZVS conditions and is equal to 13.4. $|Z_{i1}(\text{Or})|$ at k=0.09 is 2Ω and at k=0.2 is 11.5Ω. Thus, the ZVS condition given in equation (31) is satisfied for entire range of k from 0.09-0.2. The plot of $Z_{i0}$ and $Z_{i1}$ vs frequency is given in FIG. 5, from which we can observe that switching frequency of operation ($f_s$) is less than the $f_m$ as mentioned in Section III B. FIG. 8 shows the curve of $Z_i$ vs frequency where we can observe that, at $f_s$=85 kHz, |Z| decreases slightly as the value of k decreases from 0.2 to 0.09 due to which $I_{Prms}$ increases slightly to maintain constant power transfer mentioned in Section III B. FIG. 9 shows the plot of |H| where |H| is given in equation (35), where $V_L$ is the maximum voltage across $R_L$ as shown in FIG. 4A. It can be observed that, since |H| is nearly constant at $f_s$=85 kHz for k=0.09-0.2, $V_L$ and $V_{Lrms}$ (RMS voltage across $R_L$) are constant and since $R_L$ which is equal to 3Ω for this design is constant, thus power across $R_L$ ($P_L$) given in equation (36) or approximate value of output power is nearly constant.

$$|H| = \frac{V_L}{V_g} \tag{35}$$

$$P_L = \frac{V_{Lrms}^2}{R_L}. \tag{36}$$

B. Simulation Results and Comparison of PRSS Tuning with S-S and LCC-LCC Tuning

The DWPT design for PRSS tuning for which the analysis is shown in Section IV A is simulated in LTspice® for which the results are shown in FIG. 10 where output power is given as a function of coupling coefficient k. PRSS curve in FIG. 10 represents the output power (kW) for PRSS tuning. It can be observed from PRSS curve that the output power remains close to 10 kW for entire range of k from 0.09-0.2, where the maximum deviation in output power from 10 kW is seen at 12.5 kW.

Table II gives the RMS voltage (V), RMS current (I) and apparent power(S) for $L_{pr}$, $C_{pp}$, $C_{ps}$ and $L_p$ shown in FIG. 3, which are obtained from the simulation results of 10 kW DWPT system for PRSS tuning. The quality factor (Q) for $L_{pr}$ and $L_p$ are taken to be 300, and for $C_{pp}$ and $C_{ps}$ are taken to be 1000, based on which the total loss in 4 components is calculated and given in Table II.

The values of V, I, S and total loss for k=0.09, 0.15 and 0.2 are within the bounds of any 10 KW IPT system.

TABLE II

V, I, and S for components of PRSS tuning.

| Parameter | k = 0.09 | k = 0.15 | k = 0.2 |
|---|---|---|---|
| $V_{Lpr}$ | 334 V | 274 V | 254 V |
| $I_{Lpr}$ | 66 A | 46 A | 39 A |
| $S_{Lpr}$ | 22 kVA | 12.6 kVA | 9.9 kVA |
| $V_{Cpp}$ | 195 V | 327 V | 347 V |
| $I_{Cpp}$ | 19 A | 25 A | 25 A |
| $S_{Cpp}$ | 3.7 kVA | 8.1 kVA | 8.6 kVA |
| $V_{Cps}$ | 1676 V | 1011 V | 751 V |
| $I_{Cps}$ | 62 A | 37 A | 28 A |
| $S_{Cps}$ | 103.9 kVA | 37.4 kVA | 21 kVA |
| $V_{Cp}$ | 1670 V | 1032 V | 801 V |
| $I_{Cp}$ | 62 A | 37 A | 28 A |
| $S_{Cp}$ | 103.5 kVA | 38.1 kVA | 22.4 kVA |
| Total Loss | 526 W | 214 W | 137 W |

This section also shows comparison of output power vs coupling coefficient k curves for PRSS, series-series and LCC-LCC tuning in FIG. 10. For comparison between different types of tuning, the output power at k=0.15 is kept same at 11 kW and the power variation for the three types of tuning is analyzed. For series-series (S-S) tuning, the output power vs k curves are obtained for parameters of a 10 kW DWPT design in Section IV A before adding the parallel LC resonant tank and are represented by S-S curve in FIG. 10. It can be observed from FIG. 10 that the output power increases as the value of k decreases from 0.2 to 0.09. The maximum output power deviation for S-S from 10 kW is seen at approximately 18 kW. Output power versus k curves are also obtained for a 10 kW double-sided LCC tuning (LCC-LCC) and are represented by LCC-LCC curve in FIG. 10. It can be observed from FIG. 10 that the output power for LCC-LCC tuning decreases as the value of k decreases from 0.2 to 0.09. The maximum output power deviation for LCC-LCC from 10 kW is seen at approximately 15 kW. From PRSS curve in FIG. 10, the output power does not vary much as the value of k decreases from 0.2 to 0.09. The output power at k=0.2 is 9 kW and at k=0.09 is 10 kW. The maximum output power deviation for LCC-LCC from 10 kW is seen at 12.5 kW.

V. CONCLUSION

Parallel resonant series-series (PRSS) tuning method for IPT systems to maintain nearly constant power over a range of coupling coefficient k has been proposed herein. A detailed design procedure for PRSS tuning has been presented herein for achieving a nearly constant power for the range of k selected according the application of IPT system. The ZVS analysis for the proposed tuning to achieve ZVS for the inverter transistors has also been presented herein. A design example of the proposed tuning method for a DWPT system has been shown herein. The DWPT design example has been verified with simulations showing nearly constant power curve for the range of k selected. Finally, a brief comparison of the PRSS tuning with series-series and double-sided LCC tuning showing the output power curves has been done. The PRSS tuning achieved a nearly constant power for DWPT design example with minimum deviation of output power for k ranging from 0.09-0.2 compared to series-series tuning where output power increased with decrease in value of k from 0.2 to 0.09 and double-sided LCC tuning where output power decreased with decrease in value of k from 0.2 to 0.09.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power converter comprising:

a switching section;

a tuning section with an input connected to an output of the switching section, the tuning section comprising:

a loosely coupled transformer comprising a primary inductance $L_p$ and a secondary inductance $L_s$;

a primary series capacitor $C_{ps}$ connected in series with a primary winding of the transformer and a secondary series capacitor $C_{ss}$ connected in series with a secondary winding of the transformer, wherein the primary series capacitor $C_{ps}$ is chosen to be at a resonant frequency $\omega_r$ with the primary inductance $L_p$ and wherein the secondary series capacitor $C_{ss}$ is chosen to be at the resonant frequency $\omega_r$ with the secondary inductance $L_s$;

a primary parallel capacitor $C_{pp}$, of a parallel resonant tank connected in parallel with the primary series capacitor $C_{ps}$ and the primary winding; and a primary resonant inductor $L_{pr}$, of the parallel resonant tank connected in series between the output of the switching section and a connection between the primary parallel capacitor $C_{pp}$ and the primary series capacitor $C_{ps}$, wherein an input impedance $Z_i$ of the parallel resonant tank at a switching frequency $\omega_s$ is below an intersection frequency $f_m$ intersecting an open circuit input impedance $Z_{i\infty}$ of the parallel resonant tank and a short circuit input impedance $Z_{i0}$ of the parallel resonant tank; and a rectification section with an input connected to an output of the tuning section and an output connectable to a load.

2. The power converter of claim 1, wherein the switching section comprises four switches arranged in an H-bridge and the rectification section is configured as an H-bridge rectifier comprising an output capacitor $C_f$ across output terminals of the output of the rectification section.

3. The power converter of claim 2, wherein the switches of the switching section are semiconductor switches and the rectifier section comprises one of diodes and semiconductor switches.

4. The power converter of claim 1, wherein the transformer comprises an air gap between the primary winding configured as a fixed primary charging pad and the secondary winding, wherein the secondary winding and the rectification section are one of mobile and stationary.

5. The power converter of claim 1, wherein the intersection frequency $f_m$ is defined as:

$$f_m = \frac{1}{2\pi\sqrt{2L_{pr}C_{pp}}}.$$

6. The power converter of claim 1, wherein the primary winding and the secondary winding are coupled with a coupling coefficient k that is related to root-mean-square (RMS) current $I_{Prms}$ at the primary series capacitor $C_{ps}$ while output power $P_{out}$ at the load is substantially constant according to the equation:

$$P_{out} = \frac{\omega_r^2\left(k\sqrt{L_pL_s}\right)^2 I_{Prms}^2}{R_L + r_s},$$

wherein:

$r_s$ is a resistance of the secondary winding; and $R_L$ is a load impedance from an input to the rectification section.

7. The power converter of claim 1, wherein the primary resonant inductor $L_{pr}$ and the primary parallel capacitor $C_{pp}$ are chosen wherein the switching section operates as zero voltage switching for a condition where the input impedance $Z_{i1}$ at the primary series capacitor $C_{ps}$ at the resonant frequency $\omega_r$ are defined by:

$$|Z_{i1}(\omega_r)| < R_{crit},$$

where $$R_{crit} = |Z_{o0}|\sqrt{\frac{-Z_{i\infty}}{Z_{io}}},$$

$$\omega_s = \omega_r,$$

$$X_s = \omega_s L_{pr},$$

$$X_p = -\frac{1}{\omega_s C_{pp}},$$

$$Z_{i0} = jX_s,$$

$$Z_{i\infty} = jX_s + jX_p,$$

and $$Z_{o0}(j\omega_z) = \frac{jX_pX_s}{X_p + X_s}.$$

8. A method for designing a parallel resonant series-series ("PRSS") power converter, the method comprising:

selecting a primary inductance $L_p$, a secondary inductance $L_s$, a primary resistance $r_p$, a secondary resistance $r_s$, a primary quality factor $Q_1$, and a secondary quality factor $Q_2$ for a loosely coupled transformer comprising a primary charging pad and a secondary pad, a range of coupling coefficients k of the transformer, and a switching frequency $\omega_s$ of a switching section of the power converter;

selecting a capacitance for a primary series capacitor $C_{ps}$ connected in series with a primary winding of the transformer and a secondary series capacitor $C_{ss}$ connected in series with a secondary winding of the transformer, wherein the capacitance of the primary series capacitor $C_{ps}$ is chosen to be at a resonant frequency $\omega_r$ with the primary inductance $L_p$ and wherein the capacitance of the secondary series capacitor $C_{ss}$ is chosen to be at the resonant frequency $\omega_r$ with the secondary inductance $L_s$, wherein the resonant frequency $\omega_r$ is equal to the switching frequency $\omega_s$; and selecting a capacitance of a primary parallel capacitor $C_{pp}$, of a parallel resonant tank, connected in parallel with the primary series capacitor $C_{ps}$ and the primary winding and an inductance of a primary resonant inductor $L_{pr}$, of the parallel resonant tank, connected in series between the output of the switching section and a connection between the primary parallel capacitor $C_{pp}$ and the primary series capacitor $C_{ps}$, wherein an input impedance $Z_i$ of the parallel resonant tank at a switching frequency $\omega_s$ is below an intersection frequency $f_m$ intersecting an open circuit input impedance $Z_{i\infty}$ of the parallel resonant tank and a short circuit input impedance $Z_{i0}$ of the parallel resonant tank, wherein the power converter comprises a rectification section with an input connected to an output of the tuning section and an output connectable to a load.

9. The method of claim 8, wherein the switching section comprises four switches arranged in an H-bridge and the rectification section is configured as an H-bridge rectifier comprising an output capacitor $C_f$ across output terminals of the output of the rectification section.

10. The method of claim 8, wherein the transformer comprises an air gap between the primary winding configured as a fixed primary charging pad and the secondary winding configured, wherein the secondary winding and the rectification section are one of mobile and stationary.

11. The method of claim 8, wherein the intersection frequency $f_m$ is defined as:

$$f_m = \frac{1}{2\pi\sqrt{2L_{pr}C_{pp}}}.$$

12. The method of claim 8, wherein selecting the capacitance of the primary parallel capacitor $C_{pp}$ and the inductance of the primary resonant inductor $L_{pr}$ comprises selecting the capacitance of the primary parallel capacitor $C_{pp}$ and the inductance of the primary resonant inductor $L_{pr}$ to meet zero voltage switching conditions where the input impedance $Z_i$ at the primary series capacitor $C_{ps}$ at the resonant frequency $\omega_r$ are defined by:

$$|Z_{i1}(\omega_r)| < R_{crit},$$

where $$R_{crit} = |Z_{o0}|\sqrt{\frac{-Z_{i\infty}}{Z_{io}}},$$

$$\omega_s = \omega_r,$$

$$X_s = \omega_s L_{pr},$$

$$X_p = -\frac{1}{\omega_s C_{pp}},$$

$$Z_{i0} = jX_s,$$

-continued $$Z_{i\infty} = jX_s + jX_p,$$

and $$Z_{o0}(j\omega_z) = \frac{jX_pX_s}{X_p + X_s}.$$

13. The method of claim 8, further comprising selecting an output voltage $V_{out}$ and output power $P_{out}$ at the load and determining an equivalent load resistance $R_L$ at an input to the rectification section based on the selected output voltage $V_{out}$ and output power $P_{out}$ at the load, wherein:

$$R_L = \frac{8V_{out}^2}{\pi^2 P_{out}}.$$

14. The method of claim 13, further comprising, for a lowest coupling coefficient k in a selected range, calculating an absolute value of input impedance $|Z_{i1}|$ at the primary series capacitor $C_{ps}$ at the resonant frequency $\omega_r$, wherein the primary winding and the secondary winding are coupled with the coupling coefficient k, and wherein the input impedance $Z_{i1}$ at the primary series capacitor $C_{ps}$ is defined as:

$$Z_{i1}(\omega_r) = r_s + \frac{\omega_r^2\left(k\sqrt{L_pL_s}\right)^2}{R_L + r_s},$$

and calculating a root-mean-square ("RMS") value of current $I_{Prms}$ at the primary series capacitor $C_{ps}$ is $$I_{Prms} = \frac{I_p}{\sqrt{2}}$$

wherein $I_p$ comprises an input current to the primary series capacitor capacitor $C_{ps}$ is $C_{ps}$.

15. The method of claim 14, further comprising selecting a maximum open circuit voltage $V_{oc}$ and a maximum short circuit current $I_{sc}$ at the primary series capacitor $C_{ps}$ based on:

$$\frac{|v|^2}{V_{oc}^2} + \frac{|i_p|^2}{I_{SC}^2} = 1.$$

16. A wireless power transfer (WPT) power converter comprising:

a switching section comprising four semiconductor switches arranged in an H-bridge;

a tuning section with an input connected to an output of the switching section, the tuning section comprising:

a loosely coupled transformer comprising a primary inductance $L_p$ and a secondary inductance $L_s$, wherein the transformer comprises an air gap between the primary winding configured as a primary charging pad and the secondary winding;

a primary series capacitor $C_{ps}$ connected in series with a primary winding of the transformer and a secondary series capacitor $C_{ss}$ connected in series with a secondary winding of the transformer, wherein the primary series capacitor $C_{ps}$ is chosen to be at a resonant frequency $\omega_r$ with the primary inductance $L_p$ and wherein the secondary series capacitor $C_{ss}$ is chosen to be at the resonant frequency $\omega_r$ with the secondary inductance $L_s$, wherein the resonant frequency $\omega_r$ is equal to the switching frequency $\omega_s$;

a primary parallel capacitor $C_{pp}$, of a parallel resonant tank connected in parallel with the primary series capacitor $C_{ps}$ and the primary winding; and a primary resonant inductor $L_{pr}$, of the parallel resonant tank connected in series between the output of the switching section and a connection between the primary parallel capacitor $C_{pp}$ and the primary series capacitor $C_{ps}$, wherein an input impedance $Z_i$ of the parallel resonant tank at a switching frequency $\omega_s$ is below an intersection frequency $f_m$ intersecting an open circuit input impedance $Z_{i\infty}$ of the parallel resonant tank and a short circuit input impedance $Z_{i0}$ of the parallel resonant tank, wherein the intersection frequency $f_m$ is defined as:

$$f_m = \frac{1}{2\pi\sqrt{2L_{pr}C_{pp}}};$$

and a rectification section with an input connected to an output of the tuning section and an output connectable to a load, the rectification section is configured as an H-bridge rectifier comprising an output capacitor $C_f$ across output terminals of the output of the rectification section, wherein the secondary winding and the rectification section are one of mobile and stationary.

17. The WPT power converter of claim 16, wherein the primary winding and the secondary winding are coupled with a coupling coefficient k that is related to root-mean-square (RMS) current $I_{Prms}$ at the primary series capacitor $C_{ps}$ while output power $P_{out}$ at the load is substantially constant according to the equation:

$$P_{out} = \frac{\omega_r^2\left(k\sqrt{L_pL_s}\right)^2 I_{Prms}^2}{R_L + r_s},$$

wherein:

$r_s$ is a resistance of the secondary winding; and $R_L$ is a load impedance from an input to the rectification section.

18. The WPT power converter of claim 16, wherein the primary resonant inductor $L_{pr}$ and the primary parallel capacitor $C_{pp}$ are chosen such that the switching section operates as zero voltage switching for a conditions where the input impedance $Z_{i1}$ at the primary series capacitor $C_{ps}$ at the resonant frequency $\omega_r$ are defined by:

$$|Z_{i1}(\omega_r)| < R_{crit},$$

where $$R_{crit} = |Z_{o0}|\sqrt{\frac{-Z_{i\infty}}{Z_{io}}},$$

-continued $$\omega_s = \omega_r,$$

$$X_s = \omega_s L_{pr},$$

$$X_p = -\frac{1}{\omega_s C_{pp}},$$

$$Z_{i0} = jX_s,$$

$$Z_{i\infty} = jX_s + jX_p,$$

and $$Z_{o0}(j\omega_z) = \frac{jX_pX_s}{X_p + X_s}.$$

19. The WPT power converter of claim 16, wherein for a selected output voltage $V_{out}$ and for a selected output power $P_{out}$ at the load, an equivalent load resistance $R_L$ at an input to the rectification section is based on the selected output voltage $V_{out}$ and output power $P_{out}$ at the load, wherein:

$$R_L = \frac{8V_{out}^2}{\pi^2 P_{out}}.$$

20. The WPT power converter of claim 19, wherein a root-mean-square (RMS) value of current $I_{Prms}$ at the primary series capacitor $C_{ps}$ is calculated as $$I_{Prms} = \frac{I_p}{\sqrt{2}}$$

where $I_p$ comprises an input current at the primary series capacitor $C_{ps}$, wherein the primary winding and the secondary winding are coupled with a coupling coefficient k and the input impedance $Z_{i1}$ at the primary series capacitor $C_{ps}$ at the resonant frequency $\omega_r$ is defined as:

$$Z_{i1}(\omega_r) = r_s + \frac{\omega_r^2\left(k\sqrt{L_pL_s}\right)^2}{R_L + r_s},$$

wherein:

$r_s$ is a resistance of the secondary winding; and $R_L$ is a load impedance from an input to the rectification section, and a maximum open circuit voltage $V_{oc}$ and a maximum short circuit current $I_{sc}$ at the primary series capacitor $C_{ps}$ are determined based on:

$$\frac{|v|^2}{V_{oc}^2} + \frac{|i_p|^2}{I_{SC}^2} = 1.$$

* * * * *